July 14, 1964   G. J. RANDOLPH, JR   3,140,605
AERODYNAMICALLY ALIGNED ACCELEROMETER
Filed Sept. 3, 1959
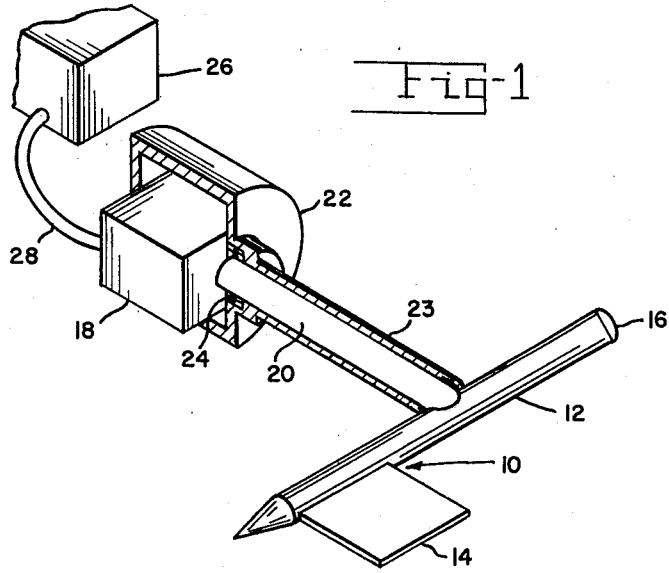
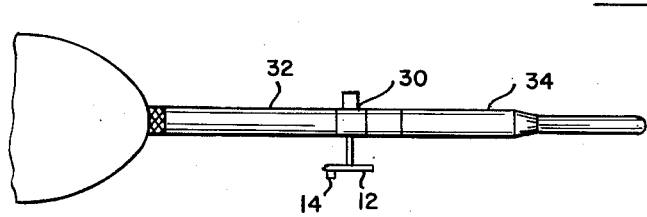
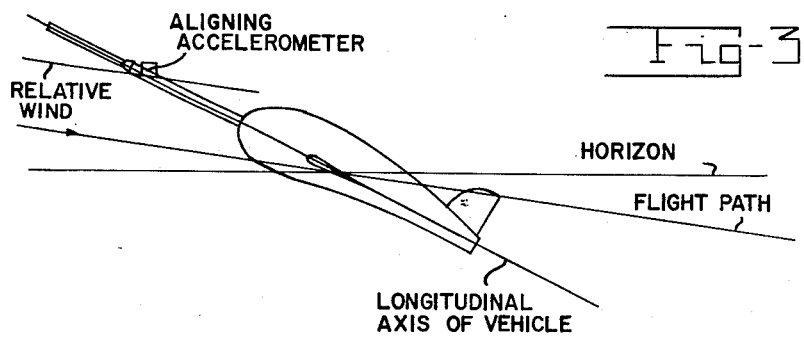
INVENTOR.
GEORGE J. RANDOLPH, JR.
BY
ATTORNEYS

United States Patent Office 3,140,605
Patented July 14, 1964

1

3,140,605
AERODYNAMICALLY ALIGNED
ACCELEROMETER
George J. Randolph, Jr., Manhattan Beach, Calif., assignor to the United States of America as represented by the Secretary of the Air Force
Filed Sept. 3, 1959, Ser. No. 838,000
5 Claims. (Cl. 73—178)
(Granted under Title 35, U.S. Code (1952), sec. 266)

The invention described herein may be manufactured and used by or for the United States Government for governmental purposes without payment to me of any royalty thereon.

This invention relates to a newly developed technique of aligning the sensitive axis of a longitudinal accelerometer with the flight path of an aircraft.

An object of the present invention is to provide a method of directly acquiring aircraft flight acceleration data along the flight path of a vehicle in flight.

A further object of the present invention is to provide a method for continually aligning the sensitive axis of an accelerometer with the flight path vector of an aircraft thus yielding excess thrust over drag measurements directly.

According to the present invention the accelerometer aligning mechanism comprising a vane directly coupled to an accelerometer by means of a connecting rod or shaft; said accelerometer being mounted in the nose boom of an aircraft in such a manner as to position the axis of the connecting rod perpendicular to the longitudinal axis of the aircraft and parallel to the lateral axis of the aircraft.

These and other objects and features of the present invention are described below in detail in connection with the accompanying drawings, wherein:

FIG. 1 is a perspective view of the vane and accelerometer comprising the present invention;

FIG. 2 is a top view of the vane and accelerometer mounted on an aircraft nose boom; and FIG. 3 is a vector presentation of a climbing aircraft and the aligning accelerometer of the present invention.

Referring now in detail to the drawings wherein like numerals designate like parts and more particularly to FIG. 1 there is shown the vane 10 consisting of a shaft 12 and a vane blade 14. The shaft 12 is weighted as at 16 to provide for statically balancing the assembly.

The vane 10 is coupled directly to the accelerometer 18 by means of a connecting rod 20. The accelerometer 18 and the connecting rod 20 are mounted in a housing 22 and vane post 23 by means of ball bearings 24 in such a manner as to permit the axis of rotation of the vane accelerometer assembly to be about the axis of the connecting rod 20. The axis of the connecting rod 20 is in turn oriented to the aircraft longitudinal axis such that it is perpendicular to it and parallel to the lateral axis of the aircraft.

The accelerometer 18 is in turn connected to the recording electronic equipment 26 located within the aircraft by means of electrical transmission lines 28.

The accelerometer-vane assembly generally designated 30 is mounted in the nose boom 32 of an aircraft directly rearward of the standard airspeed probe pitot-static assembly 34 as shown in FIG. 2.

2

In operation the primary objective of the aligning accelerometer is to cause the sensitive axis of the accelerometer to always be aligned with the flight path vector of the vehicle. The axis of the vane 10 is maintained at all times parallel to the sensitive axis of the accelerometer 18 by the connecting rod 20. The vane being situated in the nose boom of the aircraft experiences the same relative wind vectors as the aircraft itself thus positioning the vane parallel to the flight path of the vehicle. With the vane so positioned it follows that the sensitive axis of the accelerometer will also be parallel to the flight path of the aircraft.

With the accelerometer's sensitive axis continually aligned with the flight path vector of the aircraft, information essential in the determination of excess thrust, coefficient of drag and angle of attack of an aircraft during flight testing will be directly supplied to the electronic equipment making such determinations. The complexity of the electronic equipment necessary for making the above computations may also be reduced through greater data input.

Although the invention has been described in detail, it is to be clearly understood that the same is by way of illustration and example only and is not to be taken by way of limitation, the spirit and scope of this invention being limited only by the terms of the appended claims.

I claim:

1. A device for directly acquiring aircraft flight acceleration data along the flight path of an aircraft comprising: a longitudinal accelerometer, a vane, and means for connecting said vane to said accelerometer continually maintaining the longitudinal axis of the vane parallel to the sensitive axis of the accelerometer.

2. A device to be mounted on the nose boom of an aircraft for directly acquiring aircraft flight data along the flight path of an aircraft comprising: a longitudinal accelerometer, a vane having a vane blade mounted thereon, a connecting rod linking said accelerometer to said vane and positioning the longitudinal axis of said vane parallel to the sensitive axis of the accelerometer, an accelerometer housing mounted in said nose boom, and means mounting said connecting rod within said housing to permit 360° rotation of the accelerometer and the vane about the axis of said connecting rod.

3. A device according to claim 2 wherein said means mounting said connecting rod within said housing comprises: ball bearings.

4. A device for directly acquiring aircraft flight acceleration data along the flight path of an aircraft comprising: an accelerometer, a vane, and a ball bearing mounted connecting rod linking said accelerometer to said vane in a fixed relationship, said vane being so positioned relative to said aircraft as to experience the same relative wind vectors as the aircraft thus aligning the sensitive axis of said accelerometer with the flight path of said aircraft.

5. A device for aligning the sensitive axis of an accelerometer with the flight path of an aircraft, said device being mounted in the nose boom of an aircraft and comprising: an accelerometer, a vane, said vane consisting of a vane shaft and a vane blade, a connecting rod directly linking said vane to said accelerometer so that the axis of the vane shaft is parallel to the sensitive axis of the accelerometer, an accelerometer housing mounted in said nose boom, ball bearings mounting said connecting rod within said housing permitting 300° rotation of said vane and said accelerometer about the axis of said connecting rod, said vane being positioned in such a relationship with said aircraft as to transmit to said accelerometer flight path data.

References Cited in the file of this patent
UNITED STATES PATENTS

| | | |
|---|---|---|
| 2,202,987 | Egenas | June 4, 1940 |
| 2,384,348 | Schweitzer | Sept. 4, 1945 |
| 2,714,309 | Redemske | Aug. 2, 1955 |
| 2,752,792 | Draper et al. | July 3, 1956 |
| 2,899,823 | Parsons | Aug. 18, 1959 |
| 2,936,617 | Beebe | May 17, 1960 |